March 3, 1942.    K. NEVE    2,275,018

PIPE JOINT

Filed Nov. 3, 1939

Inventor
Kenneth Neve
by
Edwards, Bower & Karl
Attorneys

Patented Mar. 3, 1942

2,275,018

UNITED STATES PATENT OFFICE 2,275,018

PIPE JOINT

Kenneth Neve, Hale, near Liverpool, England, assignor to Keasbey & Mattison Company, Ambler, Pa., a corporation of Pennsylvania Application November 3, 1939, Serial No. 302,626
In Great Britain November 9, 1938

2 Claims. (Cl. 285—196)

This invention relates to joints for pipes made of asbestos-cement or the like, that is to say, pipes composed essentially of fibrous material and an hydraulic binding agent.

In the past, pipes laid in the soil were nearly always of the spigot and socket type. From the points of view of both manufacturing and laying, pipes having plain ends present such advantages over spigot-and-socket pipes that they are rapidly replacing these. Further, the pipes are being made to an increasing extent of asbestos-cement or the like. These pipes have the great advantage over metal pipes that they are not attacked by water, corrosive soil and the like. There is considerable difficulty, however, in finding a jointing for such pipes with equal non-corrosive properties, but offering the convenience in assembly and the mechanical reliability given by metal jointings.

The primary object of this invention is to provide an improved joint for the purpose set forth, having non-corrosive properties.

Another object of the invention is to embed the metal members of a joint substantially wholly in non-corrosive material.

A further object is to provide a joint which can be assembled and taken down when necessary with ease.

With these and other objects in view for joining two plain-ended asbestos-cement or like pipes use is made in this invention of a joint in which thrust members surrounding the pipe ends to be joined are all made of asbestos-cement or the like and are held together by axially-running bolts that are substantially wholly concealed within the thrust members so that they are out of contact with the soil and the contents of the pipes. Preferably the thrust members consist of a sleeve and two collars and the bolts pass through holes in both the collars and the sleeve outside packing rings which are compressed against the outer surfaces of the pipes by the collars and sleeve. Further the bolt heads and nuts are preferably counter-sunk in end recesses in the collars, so that they may be completely embedded by addition of a sealing composition, such as one made of asbestos and bitumen.

As the packing rings cannot easily be so compressed that the end surfaces of the sleeve come into contact with the opposed surfaces of the collars, it is desirable to protect the bolts in the narrow radial gaps that are left between these surfaces. For this purpose rubber washers may be applied over the bolts in the gaps in question.

It is highly desirable to allow the pipes to be laid at an angle to one another. According to a further feature of the invention this is done by providing the collars with part-conical bores, with their smaller diameters facing the sleeve.

In order that the invention may be clearly understood and readily carried into effect, one joint in accordance therewith will now be described by way of example with reference to the accompanying drawing, in which—

Figure 1:
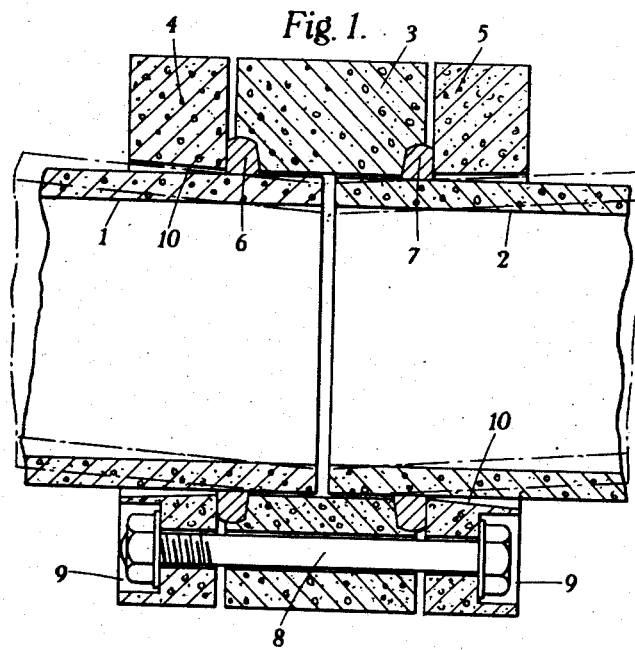
Figure 1 is a longitudinal section through the joint.
Figure 2:
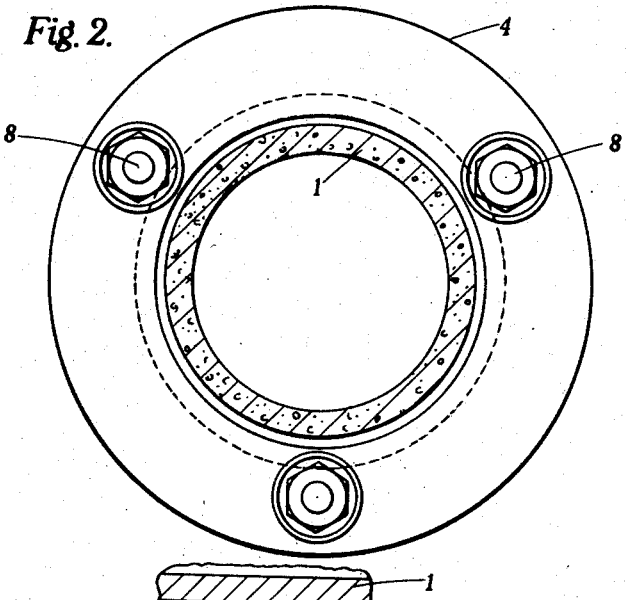
Figure 2 is an end view of the joint.

Referring first to Figures 1 and 2, two plain-ended asbestos-cement pipes 1 and 2 are joined by a joint having three thrust members, namely a sleeve 3 and two collars 4 and 5. Two packing rings, 6 and 7, are compressed between the sleeve (which is recessed to receive them) and respectively the collars 4 and 5. The thrust members are urged axially together by bolts 8, which pass through holes in all three thrust members and the heads and nuts of which lie wholly in recesses 9 in the collars. These recesses are filled up with a bitumen asbestos composition, which effectively protects the metal from corrosive agents and which can be scraped out when the joint is to be dismantled. In the joint shown, which is designed for six-inch pipes, there are three bolts, but it will be understood that the number of bolts depends to some extent upon the size of the parts.

In order to allow the pipes to be laid at an angle to one another as indicated by the dotted lines in Figure 1, each collar is formed with a part-conical bore, as shown at 10.

Figure 3:
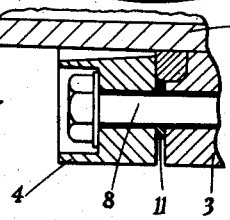
Figure 3 is a partial section showing a modification.

Since, as mentioned above, the packing rings cannot easily be exactly compressed into the recesses in the sleeve 3, narrow radial gaps may be left between the sleeve and collars. In order to protect the metal of the bolts in these gaps, rubber washers 11 may be used, as shown in Figure 3.

I claim:

1. A pipe joint comprising two pipes each composed essentially of fibrous material and an hydraulic binder and having plain ungrooved end surfaces, a sleeve surrounding the mutually adjacent ends of said pipes, at least two annular packings, one surrounding each of said pipes, two collars, the one collar surrounding one of said pipes and serving to force the annular packing around that pipe into contact with said plain end surface of that pipe and with said sleeve and other collar surrounding the second of said pipes and serving to force the annular packing around said second pipe into contact with the plain end surface of said second pipe and with said sleeve, said collars and said sleeve all being composed essentially of fibrous material and an hydraulic binder and being formed with holes lying radially outside said packing rings and closely adjacent thereto, and axially-running bolts passing through said holes to force said collars and said sleeve together under compressive forces nearly in line with the axial resistance of said packings so as to restrict the forces on the collars and sleeve to compression.

2. A pipe joint comprising two pipes each composed essentially of fibrous material and an hydraulic binder and having plain ungrooved end surfaces, a sleeve surrounding the mutually adjacent ends of said pipes, at least two annular packings, one surrounding each of said pipes, two collars, the one collar surrounding one of said pipes and serving to force the annular packing around that pipe into contact with said plain end surface of that pipe and with said sleeve and the other collar surrounding the second of said pipes and serving to force the annular packing around said second pipe into contact with the plain end surface of said second pipe and with said sleeve, said collars and said sleeve all being composed essentially of fibrous material and an hydraulic binder and being formed with holes lying radially outside said packing rings and closely adjacent thereto, and axially-running bolts passing through said holes to force said collars and said sleeve together under compressive forces nearly in line with the axial resistance of said packings so as to restrict the forces on the collars and sleeve to compression, said collars being formed with part-conical bores with their smaller diameters facing said sleeve, whereby to allow said pipes to be laid at an angle to one another.

KENNETH NEVE.